United States Patent [19]

Downie

[11] Patent Number: 4,586,048
[45] Date of Patent: Apr. 29, 1986

[54] SIDELOBE CANCELLER

[75] Inventor: John W. Downie, Dewitt, N.Y.

[73] Assignee: The United States of America as represented by the Secretary of the Air Force, Washington, D.C.

[21] Appl. No.: 121,185

[22] Filed: Mar. 4, 1971

[51] Int. Cl.⁴ ............................ G01S 7/36; G01S 3/34
[52] U.S. Cl. ..................................... 343/379; 343/381; 343/18 E
[58] Field of Search ............ 343/18 E, 18 R, 100 LE, 343/100 R, 379, 380, 381, 382, 383, 384

[56] References Cited

U.S. PATENT DOCUMENTS 3,202,990  8/1965  Howells .................... 343/100 LE
3,510,870  5/1970  Woollvin ................... 343/100 LE

FOREIGN PATENT DOCUMENTS 720345  12/1954  United Kingdom ......... 343/100 LE

Primary Examiner—Theodore M. Blum
Assistant Examiner—Gilberto Barron, Jr.
Attorney, Agent, or Firm—Donald J. Singer; Julian L. Siegel; Harry A. Herbert, Jr.

[57] ABSTRACT

An intermediate frequency sidelobe canceller having two cancellation points, one delayed with respect to the other. By utilizing the control signal generated by the loop associated with the undelayed cancellation point to control the cancelling signal at the delayed cancellation point, the "lock-on" time of the delayed cancellation point can be reduced to zero.

3 Claims, 2 Drawing Figures

FIG. I
PRIOR ART

SIDELOBE CANCELLER

BACKGROUND OF THE INVENTION

This invention relates to sidelobe cancelling and more particularly to an intermediate frequency sidelobe canceller for avoidance of low duty-cycle pulsed radar jamming.

Conventional IF sidelobe cancellers were developed to cancel barrage noise, or "brute-force" jamming. The fact that they require a few microseconds to "lock-on" before beginning to cancel barrage noise is of no consequence since the interference is intended to obliterate the radar received skin returns over a period of time. However, with the advent of deception jamming, isolated short pulses can be transmitted by a standoff jammer which penetrate to the radar receiver. This is done by making the pulse duration comparable with the loop lock-up time and spacing the pulses far enough apart to allow the error signal to decay to essentially zero between pulses. In a typical search radar utilizing a 5 microsecond pulse and using a conventional IF canceller, the integrating filter may have a bandwidth of 7000 Hz. This corresponds to a lock-on time of about 5 microseconds for a jamming pulse approximately 30 dB above receiver noise. The decay time of the error signal in the filter is approximately 100 microseconds. Therefore, if a standoff jammer emits 5 microsecond rf pulses spaced by more than 100 microseconds they will pass through the sidelobe canceller and appear on the radar scope as false targets. The "prelocked" or delayed channel method about to be described can provide a means whereby pulses of length in the order of the loop lock-up time may be cancelled irrespective of jammer pulse-to-pulse spacing.

SUMMARY OF THE INVENTION

An intermediate frequency sidelobe canceller having two cancellation points, one being delayed, utilizes a pilot or undelayed feedback loop to generate a common error signal which controls the cancelling signal associated with each cancellation point. Thus the delayed cancellation point has been "prelocked" and is ready to cancel the instant the main and omni signals reach it.

It is therefore an object of this invention to provide a novel intermediate frequency sidelobe canceller.

It is another object to provide a system for cancelling pulses of duration as short as the undelayed loop lock-on time and of any repetition rate.

These and other advantages, features and objects of the invention will become more apparent from the following description taken in connection with the illustrative embodiment in the accompanying drawings wherein:

DETAILED DESCRIPTION OF THE PREFERRED EMBODIMENT

Figure 1:
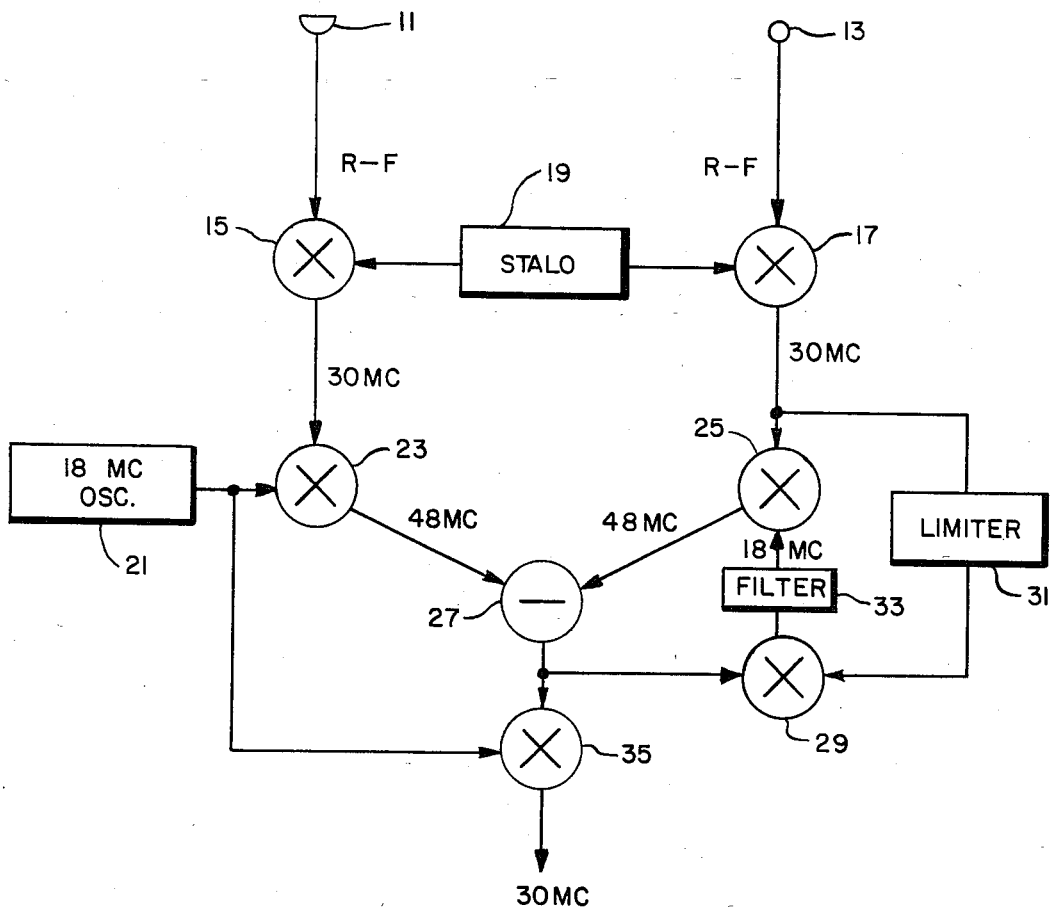
FIG. 1 shows a conventional sidelobe canceller in which the lock-on time is controlled by the bandwidth of the integrating filter.

Referring to FIG. 1, there is shown a conventional sidelobe canceller in which the lock-on time is controlled by the bandwidth of the integrating filter. Radar antenna 11 which is directional, receives the radar skin return through its mainlobe and may simultaneously receive sidelobe jamming at reduced sensitivity through its sidelobes. Omni antenna 13 is approximately equal in sensitivity to that of the main antenna for signals received through its most sensitive sidelobes. In order to properly detect a target it is necessary to eliminate that portion of the signal received by the directional antenna that is attributable to sidelobe jamming.

Antennas 11 and 13 are fed to mixers 15 and 17 respectively in which the signals therefrom are mixed with signals from stable local oscillator 19. In the example shown both channels have an intermediate frequency of 30 megacycles. The output of mixer 15 is then mixed with oscillator 21 in mixer 23 producing an output of 48 megacycles. In the omnidirectional channel the 30 megacycles is mixed with an 18 megacycle signal in mixer 25. The output 48 megacycles is subtracted from the output of mixer 23 at cancellation point 27. The output of subtractor 27, still 48 megacycles, is fed to mixer 29 which is also fed by the 30 megacycle signal from mixer 17 through limiter 31. The 18 megacycle output of mixer 29 is filtered by narrowband filter 33 and fed to mixer 25 thereby completing the loop. Mixer 35, for convenience, restores the output signal to 30 megacycles by mixing the 48 megacycle signal from cancellation point 27 with an 18 megacycle signal from local oscillator 21.

Operation of the canceller of FIG. 1 is described in detail in U.S. Pat. No. 3,202,990—Howells, and as therein explained such cancellers are quite effective against barrage jammers. As noted above, however, such IF cancellers do not completely cancel deception interference comprising short pulsed signals with pulse-to-pulse spacings substantially exceeding the decay time of the integrating filter, which is the filter 33 in FIG. 1. With such interference the cancellation signal to subtractor 27 resulting from each inputted deception pulse decays and disappears before reception of the next following deception pulse, and unless the loop lock-on time is substantially shorter than the deception pulse length the cancellation signal which is generated by such next following input pulse will not appear at the cancellation point (subtractor 27) until too late to cancel all the deception signal at that point.

Figure 2:
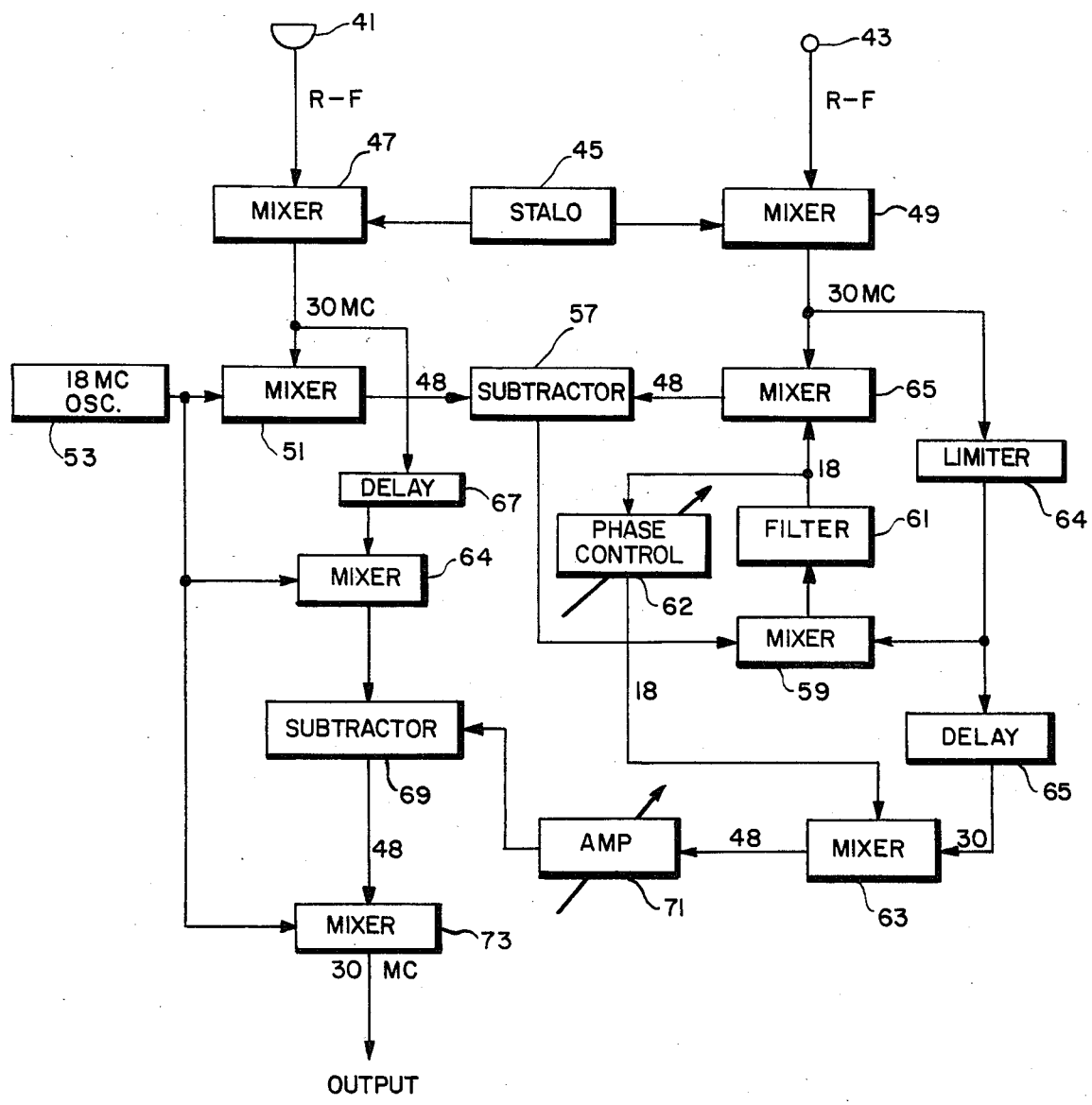
FIG. 2 is a block diagram showing a prelocked sidelobe canceller in accordance with the invention.

Referring to FIG. 2 which is an embodiment of the invention, directional radar antenna 41 and omnidirectional antenna 43 receive signals which are then mixed with the signal from stable local oscillator 45 in mixers 47 and 49. The output of mixer 47 is further mixed in mixer 51 with the signal from local oscillator 53. As in the conventional canceller previously described, the intermediate frequency signal is 30 megacycles and the frequency of oscillator 53 is 18 megacycles. The signal from mixer 49 is fed to mixer 55 and its output is fed to subtractor 57 together with the signal from mixer 51. The 30 megacycle signal from mixer 49 is also fed to mixer 59 through limiter 54 where it is mixed with the signal from subtractor 57. The output of mixer 59 is then fed through narrowband filter 61 to mixer 55 which constitutes the second input to this mixer.

The elements just described together comprise a pilot or undelayed cancellation loop in which the cancelling signal input into subtractor 57, the undelayed cancellation point, is generated under control of an error signal which is the filtered output of mixer 59. This error signal also is inputted to mixer 63 to control the delayed cancellation loop next to be described.

Mixer 63 receives signals from the narrowband filter 61 through variable phase control 62, and receives the output of mixer 49 through limiter 54 and delay circuit 65. The signal from mixer 47 is delayed in delay circuit 67, mixed to 48 megacycles in mixer 64 with 18 megacycles from oscillator 53, and applied to subtractor 69. The other input to this subtractor is from mixer 63 through variable gain amplifier 71, which provides variable amplitude control. The output of subtractor 69, which constitutes the delayed cancellation point, is mixed with 18 megacycles from oscillator 53 in mixer 73 to provide the output signal at the nominal intermediate frequency of 30 megacycles.

By properly adjusting the phase in phase control 62, and amplitude in amplifier 71, the effect of the output of amplifier 71 on subtractor 69 can be made essentially identical with the effect of the output of mixer 55 on subtractor 57. Then if a jammer deception pulse, whose duration approximates or exceeds the undelayed loop lock-on time, enters the two channels, by the time the wavefront reached the delayed cancellation point at subtractor 69 the error signal will have been established by the undelayed cancellation loop and applied to mixer 63 at proper amplitude and phase to cancel the entire pulse in the subtractor 69. Thus a cancelling signal is made available at the delayed cancellation point before arrival there of each jammer deception pulse irrespective of the time lapse since the next preceding such pulse.

The block diagram shows only one loop. However, several additional loops identical with those shown could be added.

In determining the time delay in delay units 65 and 67 the variation in lock-on time with signal level should be considered. Whereas the lock-on time may be 5 microseconds for a 30 dB signal, it will be progressively longer as the pulse level is reduced. This follows from the fact that with lower jamming pulse energy, the loop gain is less. In practice good results have been obtained with 8 microsecond delay lines.

What is claimed is:
1. A sidelobe canceller comprising:
   a. a directional antenna;
   b. a first local oscillator;
   c. a first mixer means fed by the directional antenna and the first local oscillator;
   d. an omnidirectional antenna;
   e. a second mixer means fed by the omnidirectional antenna;
   f. a first subtracting circuit means fed by the first and second mixer means;
   g. a third mixer means fed by a first subtracting circuit and the omnidirectional antenna;
   h. a narrow band filter fed by the third mixer means, the filtered output of the third mixer means constituting a second input to the second mixer means;
   i. a first delay circuit means fed by the omnidirectional antenna;
   j. a fourth mixer means fed by the filtered output of the third mixer means and the delayed output of the omnidirectional antenna;
   k. a second delay circuit means fed by the first mixer means; and
   l. a second subtracting circuit means fed by the fourth mixer means and the delayed output of the first mixer means.
2. A sidelobe canceller according to claim 1 which further comprises a variable amplitude control interposed between the fourth mixer means and the second subtracting circuit means.
3. A sidelobe canceller according to claim 1 which further comprises a variable phase control interposed between the filtered output of said third mixer means and the second input of said fourth mixer means.

* * * * *